(12) United States Patent
Kumar et al.

(10) Patent No.: US 11,476,883 B2
(45) Date of Patent: Oct. 18, 2022

(54) ELECTRONIC DEVICES HAVING OPTICAL AND AUDIO COMPONENTS

(71) Applicant: Apple Inc., Cupertino, CA (US)

(72) Inventors: Daniel P. Kumar, Fremont, CA (US); Michael B. Wittenberg, San Francisco, CA (US); Aditya B. Nayak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/708,883

(22) Filed: Dec. 10, 2019

(65) Prior Publication Data

US 2020/0266845 A1 Aug. 20, 2020

Related U.S. Application Data

(60) Provisional application No. 62/805,707, filed on Feb. 14, 2019.

(51) Int. Cl.
*H05K 5/00* (2006.01)
*H04B 1/3888* (2015.01)
*H04M 1/02* (2006.01)
*H04R 1/02* (2006.01)

(52) U.S. Cl.
CPC ........ *H04B 1/3888* (2013.01); *H04M 1/0266* (2013.01); *H04R 1/028* (2013.01); *H04M 2250/12* (2013.01); *H04R 2499/11* (2013.01)

(58) Field of Classification Search
CPC ........................................................ G06F 1/16
See application file for complete search history.

(56) References Cited

U.S. PATENT DOCUMENTS

| | | | |
|---|---|---|---|
| 8,947,627 B2 | 2/2015 | Rappoport et al. | |
| 9,690,036 B1* | 6/2017 | Hou | G02B 6/005 |
| 2007/0280053 A1* | 12/2007 | Polany | H04B 11/00 367/131 |
| 2012/0243719 A1 | 9/2012 | Franklin et al. | |

(Continued)

FOREIGN PATENT DOCUMENTS

| | | |
|---|---|---|
| CN | 1302524 A | 7/2001 |
| CN | 1914900 A | 2/2007 |

(Continued)

*Primary Examiner* — Jerry Wu
(74) *Attorney, Agent, or Firm* — Treyz Law Group, P.C.; G. Victor Treyz; David K. Cole

(57) ABSTRACT

An electronic device housing may include a display cover layer that overlaps an array of pixels. The cover layer or other portion of the housing may have an opening that forms an optical and audio port. Optical and audio components may be coupled to the port. A port cover may cover some or all of the port. The port cover may include one or more layers of mesh or other materials that allow light and sound to pass while blocking environmental contaminants. The optical components may include an ambient light sensor or other devices that receive light and/or may include devices that emit light. The audio components may include a microphone and/or a speaker. The optical component may emit or receive light that passes through the audio component. A structure in the interior of the housing may form a passageway coupled to the port through which sound and light passes.

15 Claims, 15 Drawing Sheets

(56) References Cited

U.S. PATENT DOCUMENTS

| | | | |
|---|---|---|---|
| 2013/0025904 A1* | 1/2013 | Berumen | G06F 1/182 |
| | | | 174/50.5 |
| 2013/0027849 A1 | 1/2013 | Berumen | |
| 2013/0048837 A1 | 2/2013 | Pope et al. | |
| 2013/0094126 A1 | 4/2013 | Rappoport et al. | |
| 2013/0146491 A1* | 6/2013 | Ghali | B65B 5/04 |
| | | | 206/320 |
| 2014/0219646 A1 | 8/2014 | Hooton et al. | |
| 2016/0054175 A1 | 2/2016 | Jia et al. | |
| 2017/0235210 A1 | 8/2017 | Jun | |
| 2019/0361694 A1* | 11/2019 | Gordon | G06F 1/1673 |

FOREIGN PATENT DOCUMENTS

| | | |
|---|---|---|
| CN | 101904178 A | 12/2010 |
| CN | 207217073 U | 4/2018 |
| CN | 108418918 A | 8/2018 |
| CN | 108644675 A | 10/2018 |
| CN | 209581226 U | 11/2019 |

\* cited by examiner

ELECTRONIC DEVICES HAVING OPTICAL AND AUDIO COMPONENTS

This application claims the benefit of provisional patent application No. 62/805,707, filed Feb. 14, 2019, which is hereby incorporated by reference herein in its entirety.

FIELD

This relates generally to electronic devices, and, more particularly, to electronic devices with optical and audio components.

BACKGROUND

Electronic devices may include optical components such as components that emit and/or detect light. Electronic devices may also include audio components such as speakers.

It can be challenging to incorporate components such as optical and audio components into electronic devices. For example, it may be difficult to incorporate these components into an electronic device without consuming more space than desired or without changing the appearance of the electronic device in an undesired fashion.

SUMMARY

An electronic device may have a housing. A portion of the housing may form a display cover layer that overlaps an array of pixels displaying images for a user. The display cover layer or other portion of the housing may have an opening that forms an optical and audio port. Optical and audio components may be coupled to the port. During operation of the device, light (e.g., infrared light, visible light, and/or ultraviolet light) associated with operation of an optical component may pass through the port while sound associated with operation of the audio component may pass through the same port. This configuration may help minimize port size and thereby reduce the amount of inactive area in a display.

A port cover may cover some or all of the port. The port cover may include one or more layers of mesh or other materials that allow light and sound to pass while blocking environmental contaminants. Mesh may, for example, have openings that are small enough to prevent droplets of moisture and pieces of dirt from passing while being sufficiently large to be transparent to sound. The optical components may include an ambient light sensor or other devices that receive light and/or may include devices that emit light. The audio components may include a microphone and/or a speaker. In an illustrative configuration, the optical component may emit or receive light that passes through the audio component. A structure in the interior of the housing may form a passageway coupled to the port through which sound and light passes. An optical structure such as a mirror or diffuser may be supported by the structure. Light guide structures (e.g., optical fiber(s), coherent fiber bundles, or other waveguides) may also be formed.

DETAILED DESCRIPTION

An electronic device may have electrical components including optical components and audio components. The components of the electronic device may be mounted within a housing. A port may be formed in the housing. For example, a portion of the housing may be formed from a transparent member that overlaps a display. This transparent member or other housing wall structures may have an opening that forms an optical and audio port. During operation of the electronic device, sound and light may pass through the port. The use of an opening to handle both audio and optical signals may help accommodate components within the electronic device. For example, the use of shared audio and optical ports may help reduce the amount of inactive display area that is present in an electronic device.

Figure 1:
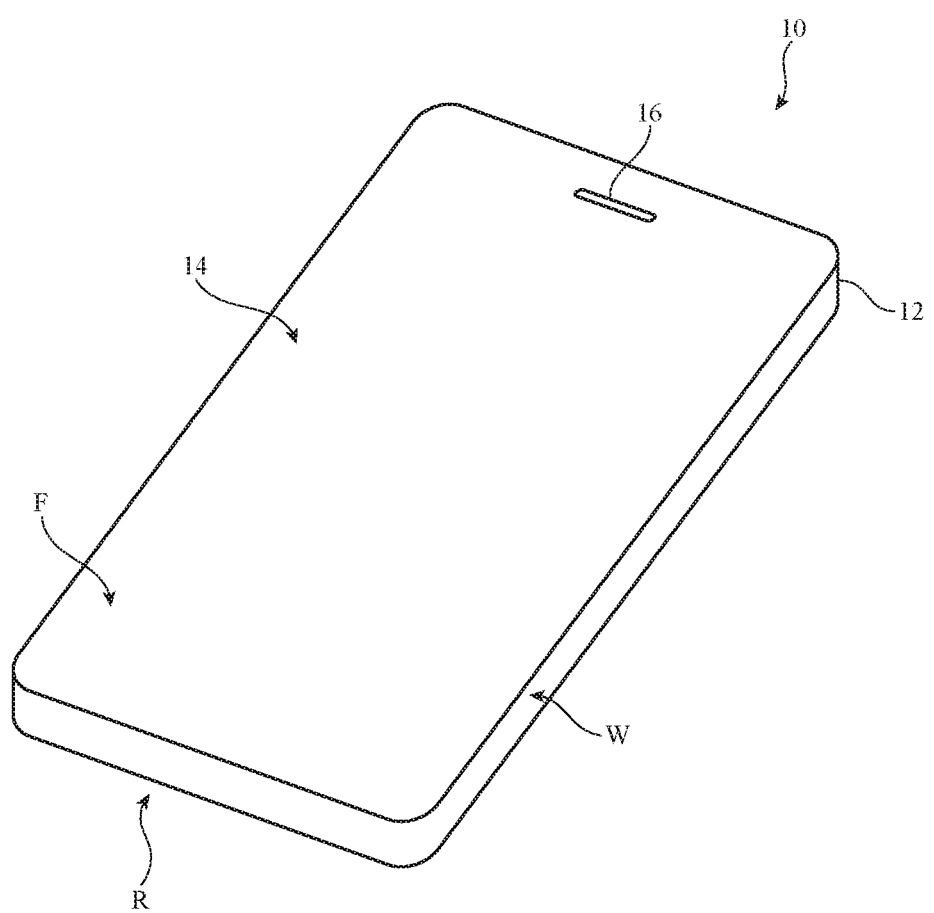
FIG. 1 is perspective view of an illustrative electronic device in accordance with an embodiment.

A perspective view of an illustrative electronic device of the type that may include optical and audio components is shown in FIG. 1. Device 10 may be a laptop computer, a computer monitor containing an embedded computer, a tablet computer, a desktop computer, a cellular telephone, a media player, or other handheld or portable electronic device, a smaller device such as a wristwatch device, a wristband device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices. In the illustrative configuration of FIG. 1, device 10 is a portable electronic device such as a cellular telephone. This configuration may sometimes be described herein as an example.

As shown in FIG. 1, device 10 may have a housing such as housing 12. Housing 12 may be formed from materials such as polymer, glass, metal, crystalline materials such as sapphire, ceramic, fabric, foam, wood, other materials, and/or combinations of these materials. Device 10 may have any suitable shape. In the example of FIG. 1, device 10 has front face F, opposing rear face R, and sidewall portions (sidewalls) W. Portions W may be formed as extensions of the housing structures on front face F, rear face R, and/or may be formed using one or more separate sidewall members (as examples). Input-output devices such as one or more buttons may be mounted on housing 12 (e.g., on sidewall portions W). A display such as display 14 may, if desired, be provided on front face F. Transparent portions of housing 12, which may sometimes be referred to as a display cover layer, transparent display covering member, or display layer, may be used to form a protective transparent cover for an array of pixels forming display 14.

Housing 12 may contain one or more ports such as port 16. Port 16 may handle both optical signals (light) and audio signals (sound) and may therefore sometimes be referred to as an optical and audio port. Port 16 may be formed from an opening in the display cover layer for display 14 on front face F or may be formed in other portions of housing 12.

Figure 2:
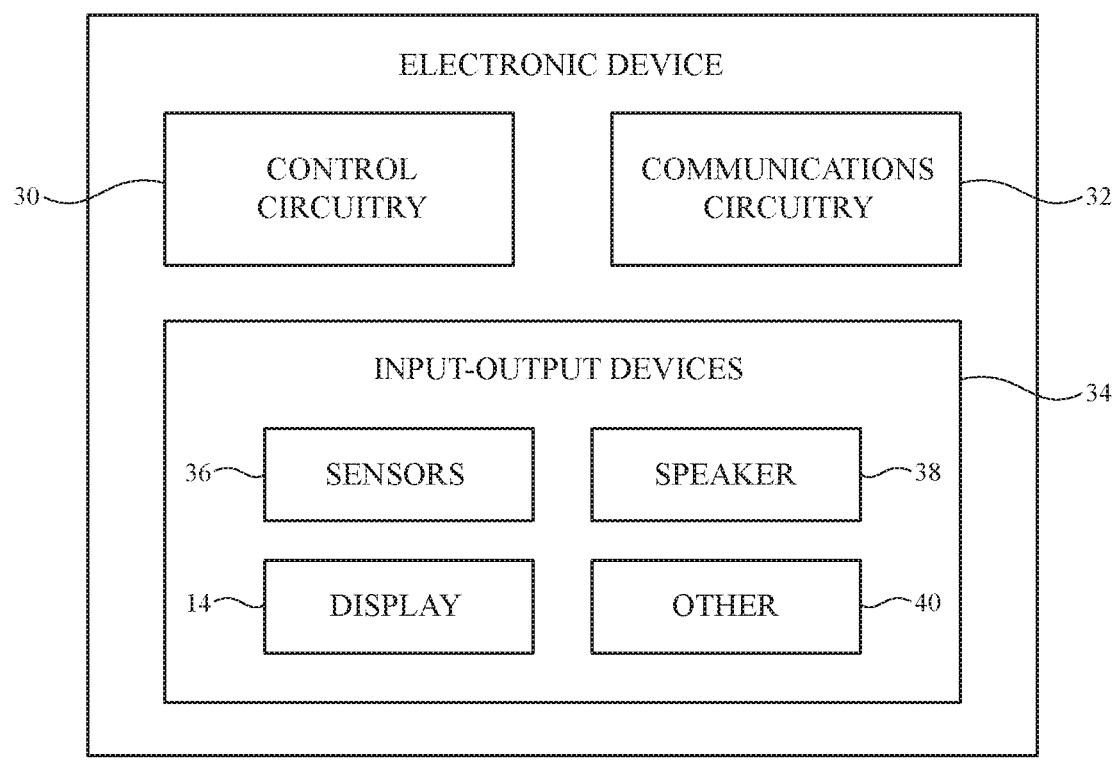
FIG. 2 is a schematic diagram of an illustrative electronic device in accordance with an embodiment.

A schematic diagram of an illustrative electronic device is shown in FIG. 2. As shown in FIG. 2, device 10 may include control circuitry 30, communications circuitry 32, and input-output devices 34.

Control circuitry 30 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 30 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment, control circuitry 30 may communicate using communications circuitry 32. Communications circuitry 32 may include antennas, radio-frequency transceiver circuitry, and other wireless communications circuitry and/or wired communications circuitry. Circuitry 32, which may sometimes be referred to as control circuitry and/or control and communications circuitry, may, for example, support wireless communications using wireless local area network links, near-field communications links, cellular telephone links, millimeter wave links, and/or other wireless communications paths.

Input-output devices 34 may be used in gathering user input, in gathering information on the environment surrounding the user, and/or in providing a user with output.

Display 14 of input-output devices 34 has an array of pixels for displaying images to users. Display 14 may be a light-emitting diode display (e.g., an organic light-emitting diode display or a display with a pixel array having light-emitting diodes formed from crystalline semiconductor dies), a liquid crystal display, or other display. Display 14 may include a two-dimensional capacitive touch sensor or other touch sensor for gathering touch input.

Devices 34 may include sensors 36. Sensors 36 may include force sensors (e.g., strain gauges, capacitive force sensors, resistive force sensors, etc.), audio sensors such as microphones, capacitive touch sensors, capacitive proximity sensors, other touch sensors, ultrasonic sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), heart rate sensors, electrocardiogram sensors, and other biometric sensors, radio-frequency sensors (e.g., radar and other ranging and positioning sensors), humidity sensors, moisture sensors, and/or other sensors.

Sensors 36 and other input-output devices 34 may include optical components such as light-emitting diodes (e.g., for camera flash or other blanket illumination, etc.), lasers such as vertical cavity surface emitting lasers and other laser diodes, laser components that emit multiple parallel laser beams (e.g., for three-dimensional sensing), lamps, and light sensing components such as photodetectors and digital image sensors. For example, sensors 36 in devices 34 may include depth sensors (e.g., structured light sensors and/or depth sensors based on stereo imaging devices that can optically sense three-dimensional shapes), optical sensors such as self-mixing sensors and light detection and ranging (lidar) sensors that gather time-of-flight measurements and/or other measurements to determine distance between the sensor and an external object and/or that can determine relative velocity, monochromatic and/or color ambient light sensors that can measure ambient light levels, proximity sensors based on light (e.g., optical proximity sensors that include light sources such as infrared light-emitting diodes and/or lasers and corresponding light detectors such as infrared photodetectors that can detect when external objects are within a predetermined distance), optical sensors such as visual odometry sensors that gather position and/or orientation information using images gathered with digital image sensors in cameras, gaze tracking sensors, visible light and/or infrared cameras having digital image sensors configured to gather image data, optical sensors for measuring ultraviolet light, and/or other optical sensor components (e.g., light sensitive devices and, if desired, light sources), photodetectors coupled to light guides, associated light emitters, and/or other optical components (one or more light-emitting devices, one or more light-detecting devices, etc.).

Input-output devices 34 may also include audio components. The audio components may include one or more microphones to sense sound (e.g., an audio sensor in sensors 36 to sense audio signals) and may include sound-emitting components such as tone generators and one or more speakers. As shown in FIG. 2, for example, input-output devices 34 may include speaker 38. Speakers may be used to support speaker-phone operations and/or may be used as ear speakers when device 10 is being held to a user's ear to make a telephone call, to listen to a voicemail message, or to listen to other audio output. For example, speaker 38 may be acoustically coupled to port 16 of FIG. 1 to form an ear speaker for device 10.

In addition to sensors 36, display 14, and speaker 38, input-output devices 34 may include user input devices such as buttons and other devices 40. Devices 40 may include, for example, optical components such as light-based output devices other than display 14 that are used to provide visual output to a user. The light-based output devices may include one or more light-emitting diodes, one or more lasers, lamps, electroluminescent devices, and/or other light emitting components. The light-based output devices may form status indicator lights. If desired, the light-based output devices may include illuminated icons (e.g., backlight symbols associated with power indicators, battery charge indicators, wireless signal strength indicators, notification icons, etc.).

Devices 40 may also include electromagnets, permanent magnets, structures formed from magnetic material (e.g., iron bars or other ferromagnetic members that are attracted to magnets such as electromagnets and/or permanent magnets), batteries, etc. Devices 40 may also include power transmitting and/or receiving circuits configured to transmit and/or receive wired and/or wireless power signals and output components such as haptic output devices and other output components (e.g., electromagnetic actuators or other actuators that can vibrate to provide a user with a haptic alert and/or haptic feedback associated with operation of a touch sensor or other input devices).

Figure 3:
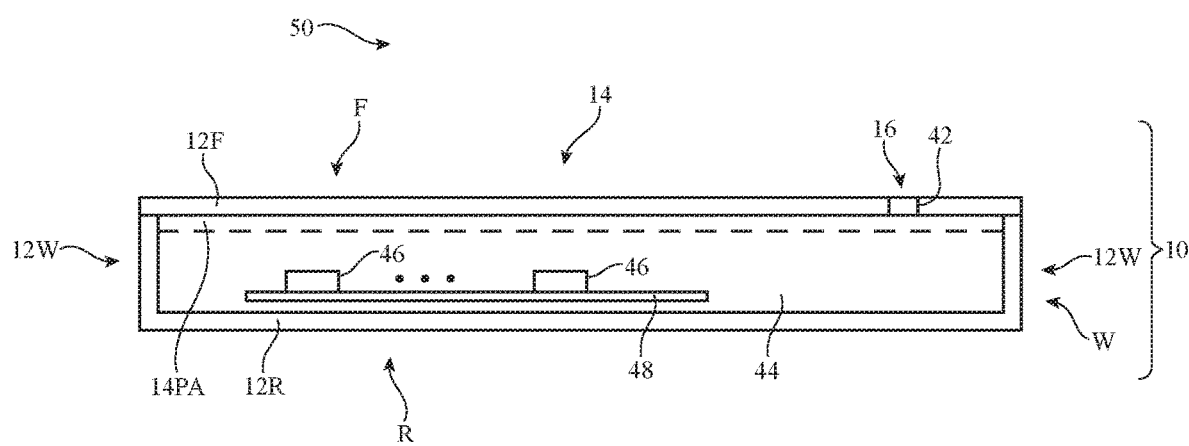
FIG. 3 is a cross-sectional side view of an illustrative electronic device in accordance with an embodiment.

A cross-sectional side view of device 10 of FIG. 1 is shown in FIG. 3. As shown in FIG. 3, housing 12 may have one or more portions such as sidewall portions 12W, front portion 12F on front face F of device 10, and rear portion 12R on rear face R of device 10. These portions may be formed from metal (e.g., aluminum, stainless steel, or other metals) or may be formed from polymer, glass, ceramic, and/or other materials.

Some or all of housing 12 may be transparent. For example, housing portion 12F may be a transparent display cover layer that overlaps and protects display pixel array 14PA of display 14. Front housing portion 12F may be formed from sapphire or other crystalline material, glass, polymer, transparent ceramic, and/or other transparent material to allow the image being displayed by the pixels of pixel array 14PA to be viewed by a user from the exterior of device 10.

Portions of display 14 that contain pixels in display pixel array 14PA may sometimes be referred to as forming an active area (AA) of display 14 (e.g., the portion of display 14 that is configured to display an image for a user). Portions of display 14 that are free of pixels and that do not display images may sometimes be referred to as forming an inactive area (IA) of display 14. To accommodate components such as optical and audio components, housing portion 12F or other portions of housing 12 may have one or more openings for forming one or more ports. As shown in FIG. 3, for example, display 14 (e.g., housing portion 12F, which serves as a display cover layer) may have an opening such as opening 42 forming optical and audio port 16.

The walls of housing 12 may separate interior region 44 of device 10 from exterior region 50 surrounding device 10. Interior region 44 may include components such as components 46. Components 46 may include integrated circuits, discrete components, a battery, wireless circuit components such as a wireless power coil, and/or other components (see, e.g., control circuitry 30, communications circuitry 32, and input-output devices 34 of FIG. 2). Components 46 may be interconnected using signal paths such as paths formed from traces on printed circuits (see, e.g., printed circuit 48).

If desired, opaque structures such as coatings of opaque ink, metal, or other opaque coating material may be provided on the surface of a housing structure that is otherwise transparent. For example, portions of a transparent member forming front housing portion 12F (e.g., portions of a display cover layer associated with an inactive area of display 14 that does not display images) may have an interior surface that is covered with opaque masking material to help hide structures in interior region 44 from view from the exterior of device 10. Optical windows may be formed in the opaque masking material of the inactive display area to allow light to pass out of and into device 10. Optical components may be aligned with the optical windows and/or may operate through gaps between pixels in array 14PA. Optical components may also operate through optical and audio port 16. For example, a light-emitting component in interior 44 may emit light that passes through opening 42 of port 16 to exterior region 50 and/or a light-detecting component in interior 44 may receive light through opening 42 of port 16. Use of the space available in port 16 for conveying light to and/or from optical component(s) in interior 44 in addition to handling audio signals may help minimize the size of the inactive area of display 14.

Figure 4:
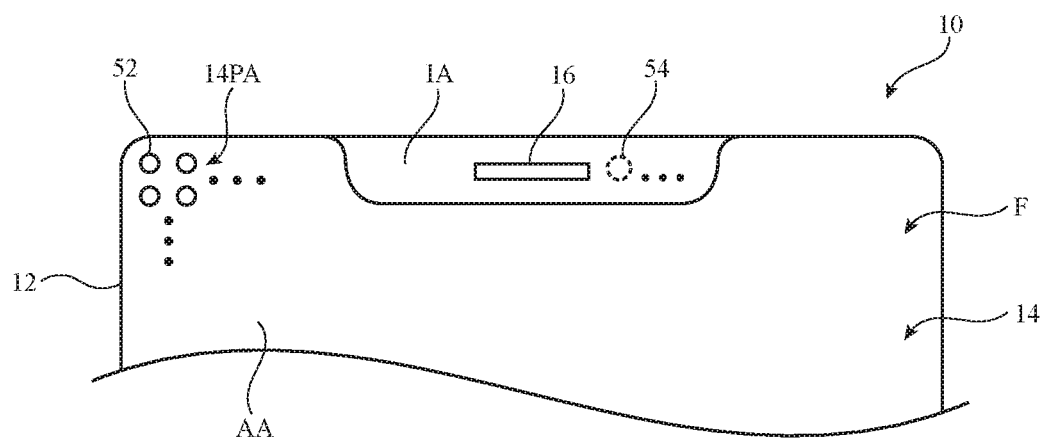
FIG. 4 is a front view of a portion of an illustrative electronic device with a notch shaped inactive area in its display in accordance with an embodiment.
Figure 5:
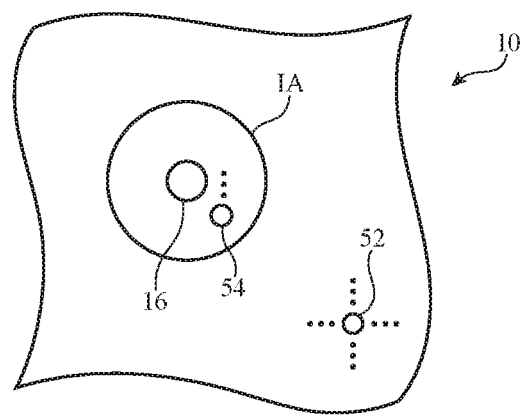
FIGS. 5 and 6 are front views of portions of illustrative electronic devices in accordance with embodiments.
Figure 6:
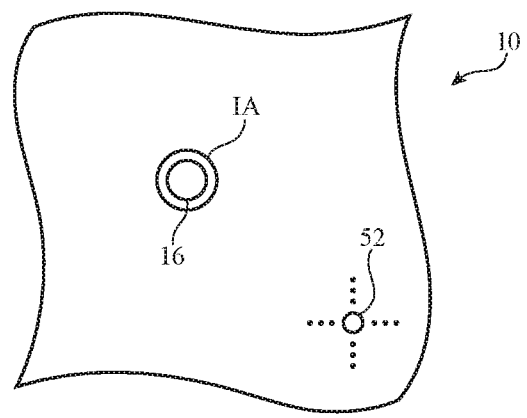

FIGS. 4, 5, and 6 show portions of front face F of illustrative electronic devices 10. As shown in FIG. 4, display 14 may be characterized by an active area AA that contains pixels 52 of pixel array 14PA for displaying images to a user. Display 14 may also be characterize by a pixel-free inactive area IA that does not contain pixels and does not display images for the user. Port 16 may be formed within inactive area IA. If desired, optical windows 54 for optical components may also be formed in portions of inactive area IA. Windows 54 may be formed from openings in an opaque masking layer on the underside of the display cover layer for display 14. If desired, some of the openings may be covered with ink, a physical vapor deposition coating, and/or other layers of material to adjust the optical properties of optical windows 54. The optical components that are aligned with windows 54 may include camera flash components, image sensors, optical proximity sensors, ambient light sensors, infrared light-emitting components such as dot projectors for three-dimensional image sensors, infrared flood illuminators, and infrared cameras (e.g., for three-dimensional image sensors), and/or other light-emitting and/or light-detecting components. One or more of these components may also be configured to emit and/or receive light through port 16.

In the example of FIG. 4, inactive area IA has the shape of a notch (e.g., a recess in active area AA that is formed along the center portion of the top peripheral edge of housing 12). Other shapes for inactive area IA may be used, if desired. For example, an island-shaped inactive area IA may be formed within the active area as shown in FIG. 5 (e.g., the pixel array of the display may surround inactive area IA) and one or more optical component windows 54 may be formed in the inactive area. If desired, the size of inactive area IA may be reduced (e.g., to a small amount such as an amount that is invisible or nearly invisible to the naked eye of the user) and may not include any optical component windows (see, e.g., FIG. 6). The outline of port 16 and/or the inactive area in device 10 may be circular, oval, rectangular, or other shapes, may have straight edges, curved edges, and/or combinations of straight and curved edges, and/or may have other suitable footprints. Other arrangements may be used, if desired. For example, one or more optical and audio ports such as port 16 may be formed in portions of housing 12 that do not overlap display 14, portions of housing sidewalls, portions of rear housing walls, and/or other portions of housing 12.

In arrangements in which port 16 is located at the upper end of housing 12, port 16 may serve as an audio port such as an ear speaker port in addition to handling light signals for one or more optical components. To prevent dust, moisture, and other environmental contaminants from entering into interior region 44 from exterior region 50, port 16 may be provided with a port cover. The port cover may be transparent to sound and light while helping to block dust particles, moisture droplets, and other unwanted substances. The port cover may, for example, be formed from one or more layers of mesh and/or one or more perforated layers.

Figure 7:
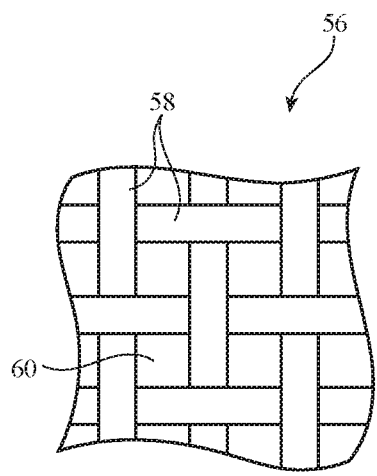
FIG. 7 is a diagram of an illustrative mesh layer that may be used in a port cover in accordance with an embodiment.

An illustrative mesh layer that may be used in a port cover is shown in FIG. 7. As shown in FIG. 7, a mesh layer such as mesh layer 56 may be formed from strands of material such as strands 58. Strands 58 may be formed from metal, polymer, glass, ceramic, cotton or other natural materials, other materials, and/or combinations of these materials. Stands 58 may be woven or otherwise intertwined to form a mesh (grid-shaped layer) with openings 60 that are sufficiently large to allow light and sound to pass while being sufficiently small to block dirt and moisture. In some configurations, the material of strands 58 may be transparent to light.

Figure 8:
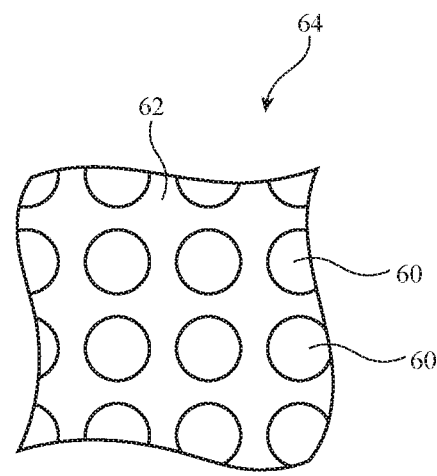
FIG. 8 is a diagram of an illustrative layer with openings for use in a port cover in accordance with an embodiment.

An illustrative perforated layer that may be used in a port cover is shown in FIG. 8. As shown in FIG. 8, perforated layer 64 may have a layer of material such as layer 62. Layer 62 may be formed from metal, polymer, glass, ceramic, natural materials, other materials, and/or combinations of these materials. One or more openings such as an array of perforations 60 (e.g., openings with circular shapes, rectangular shapes, or other suitable outlines) may be formed within layer 62 to allow light and sound to pass through layer 64. If desired, layer 62 may be formed from a transparent material to allow light to pass through layer 62 in addition to passing through openings 60.

Figure 9:
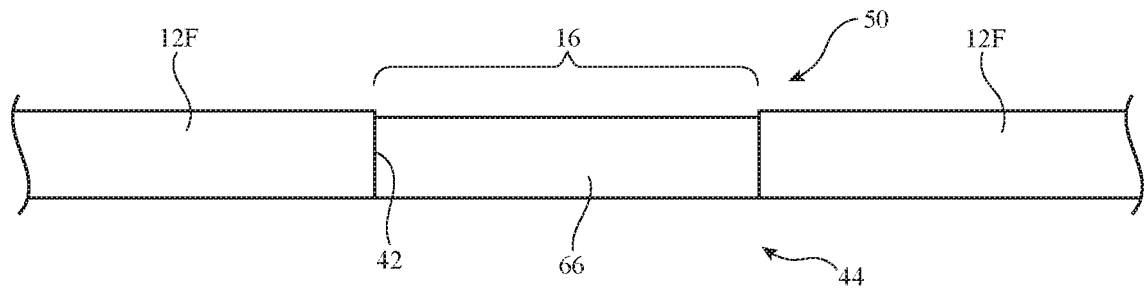
FIG. 9 is a cross-sectional side view of a display layer such as a display cover layer having an opening for forming an optical and audio port in accordance with an embodiment.

Structures such as the structures of FIGS. 7 and 8 (e.g., solid structures, one or more layers of material that are stacked on top of each other, mesh layers such as mesh layer 56, layers with openings such as perforated layer 64, etc.) can be used to form a port cover for port 16. FIG. 9 is a cross-sectional side view of port 16 showing how port cover 66 for port 16 may be formed within opening 42 in housing portion 12F (e.g., a display cover layer). When port cover 66 is present, sound and light may pass through port 16, but the passage of contaminants such as moisture and dust from exterior region 50 to interior 44 is blocked.

Figure 10:
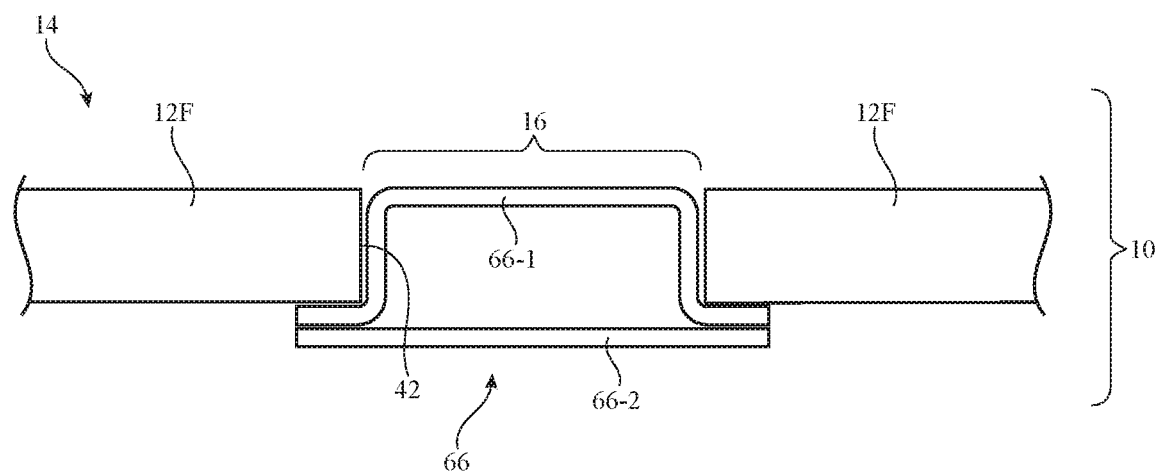
FIG. 10 is a cross-sectional side view of an illustrative display cover layer with an opening that is covered with an acoustically and optically transparent port cover formed from multiple layers of acoustically and optically transparent port covering material in accordance with an embodiment.

An illustrative port cover arrangement for port 16 is shown in FIG. 10. As shown in FIG. 10, port cover 66 may have multiple layers of material such as layers 66-1 and 66-2 and may, if desired, have optional stiffener structures. During operation of device 10, light and sound may pass through port cover 66. Layer 66-1 may be, for example, a metal mesh or perforated layer that is formed on the outer side of port 16. Layer 66-2 may be, for example, a polymer fabric layer (polymer strand mesh) that is formed on the inner side of port 16. In this type of configuration, outer layer 66-1 may have a desired cosmetic appearance (e.g., relatively large openings) and inner layer 66-2, which may have smaller openings, may help block fine particles and moisture. Hydrophobic coatings may be formed on one or both of the layers to help repel moisture. Other stacks of two or more layers may also be used in forming a port covering, a port covering may be formed by a single layer of material with openings for sound and light, and/or some or all of port 16 may be uncovered by port cover 66. The use of inner and outer port cover layers that overlap opening 42 of the display cover layer formed from front housing portion 12F in port cover 66 of FIG. 10 is illustrative.

Figure 11:
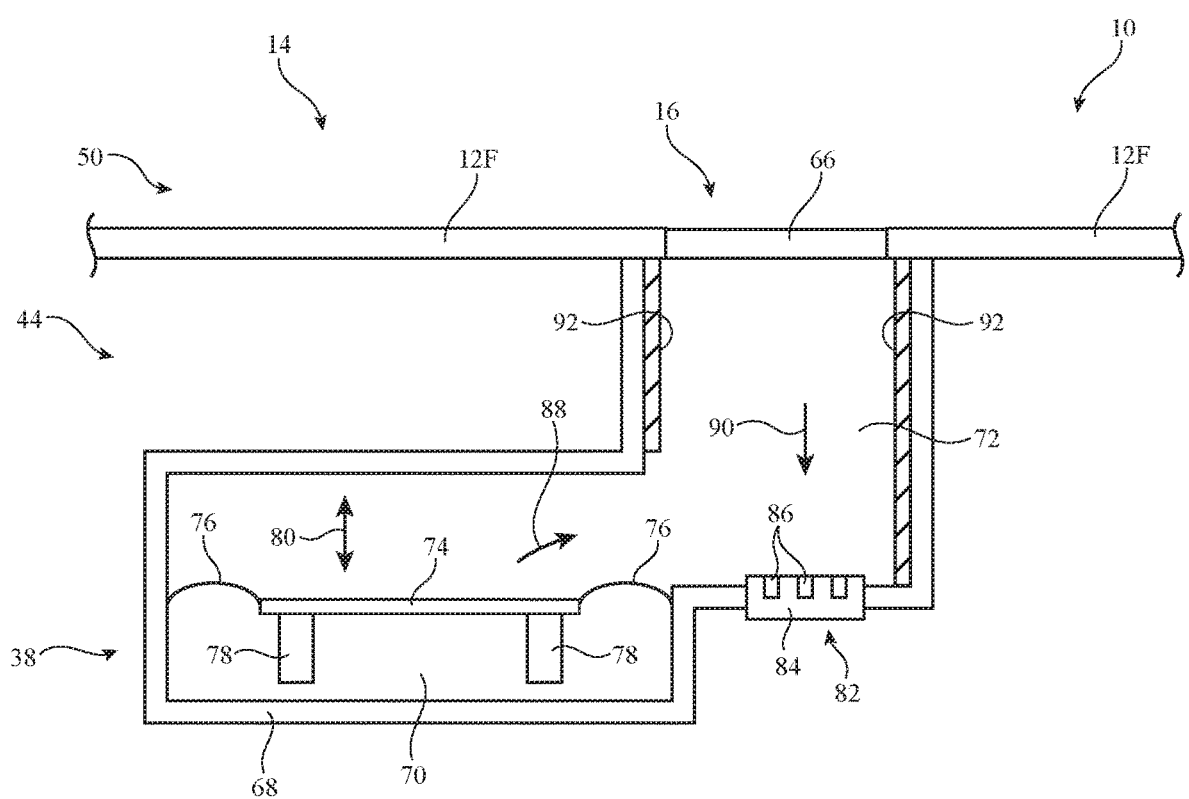
FIG. 11 is a cross-sectional side view of an illustrative electronic device having a shared optical and audio port in accordance with an embodiment.

Because port 16 may handle both audio and optical signals, an audio component such as speaker 38 and one or more optical components such as ambient light sensors or other components may share port 16. An illustrative arrangement in which port 16 is used to handle sound and light is shown in FIG. 11. As shown in FIG. 11, port 16 may be aligned with multiple electrical components including one or more audio components such as speaker 38 (and/or a microphone) and one or more optical components such as optical component 82.

Optical component 82 may be configured to emit light and/or receive light. In the example of FIG. 11, optical component 82 is an ambient light sensor and includes semiconductor die 84 (e.g., a silicon die) with one or more photodetectors 86 (e.g., photodiodes). The ambient light sensor may be a monochrome ambient light sensor that measures the intensity of ambient light 90 or may be a color ambient light sensor. In a color ambient light sensor configuration, each photodetector 86 may be overlapped by a color filter with a different respective pass band (color) so that the color ambient light sensor can make measurements of the intensity of light of different colors. This allows the color ambient light sensor to measure ambient light color and intensity. Ambient light color measurements may be represented using color coordinates, a color temperature, a correlated color temperature, a color light spectrum, or other suitable color measurement format.

Speaker 38 may have a diaphragm such as diaphragm 74 that is supported by flexible surround 76. Actuator 78 may be an electromagnetic actuator such as a moving-magnetic actuator or a moving coil actuator or may be any other suitable type of actuator. During operation of speaker 38, actuator 78 may be driven by analog audio signals (drive currents) from control circuitry 30 to produce movement (vibrations) of diaphragm in directions 80 and thereby produce sound 88.

Structures such as structure 68 (e.g., structures formed from polymer, metal, glass, ceramics, other materials, and/or combinations of these materials) may form mounting structures (internal support structures such as mounting brackets or other members) and/or may form portions of the structures of audio and optical components (e.g., speaker housing portions, packages for optical components, and/or other enclosure and supporting structures etc.). For example, structure 68 may form a speaker box for speaker 38 (e.g., a speaker box that forms speaker back volume 70 for speaker 38, etc.) These structures may be used to help direct sound to and/or from and audio components and/or to help direct light to and/or from optical components.

In the example of FIG. 11, structure 68 forms a support for optical component 82 (e.g., an ambient light sensor). Structure 68 may have a passageway such as passageway 72 through which the audio and optical components are coupled to port 16. In the example of FIG. 11, passageway 72 is aligned with optical component 82, so that light 90 that is received through port cover 66 of port 16 may pass through passageway 72 to optical component 82. Passageway 72 communicates with speaker 38, so that sound 88 that is produced by speaker 38 may exit device interior 44 to exterior region 50 through port cover 66 of port 16. In the example of FIG. 11, speaker 38 is set off to one side of the entrance formed by passageway 72. Other configurations may be used, if desired.

Figure 12:
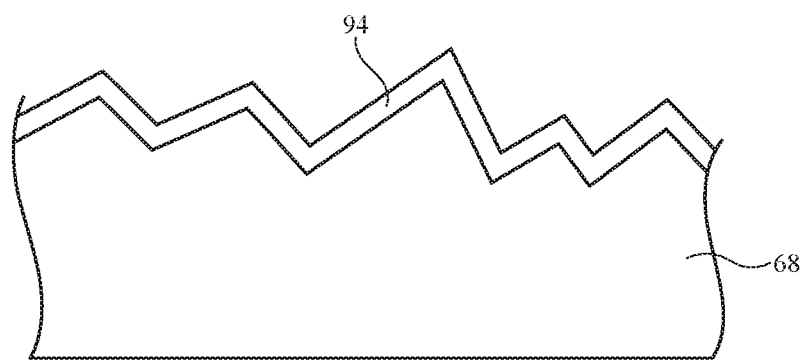
FIG. 12 is a cross-sectional side view of an illustrative diffuser structure formed from a textured material with a coating in accordance with an embodiment.

In some configurations, optical and/or audio structures may be incorporated into structure 68 to help modify the sound and light passing through structure 68. As an example, light-diffusing structures such as diffuser structure 92 may be formed on the inner surfaces of passageway 72 to help diffuse incoming light 90 while directing light 90 to optical component 82. Reflectors (e.g., mirrors), lenses, filters, and/or other optical elements may be included, if desired. FIG. 12 shows how portions of structure 68 may be textured and covered with reflective coating 94 (e.g., a metal layer, a stack of dielectric layers forming a dielectric mirror coating, white polymer, and/or other reflective material). This type of structure and/or other light-diffusing structures may be used in forming light diffuser structure 92 of FIG. 11.

Figure 13:
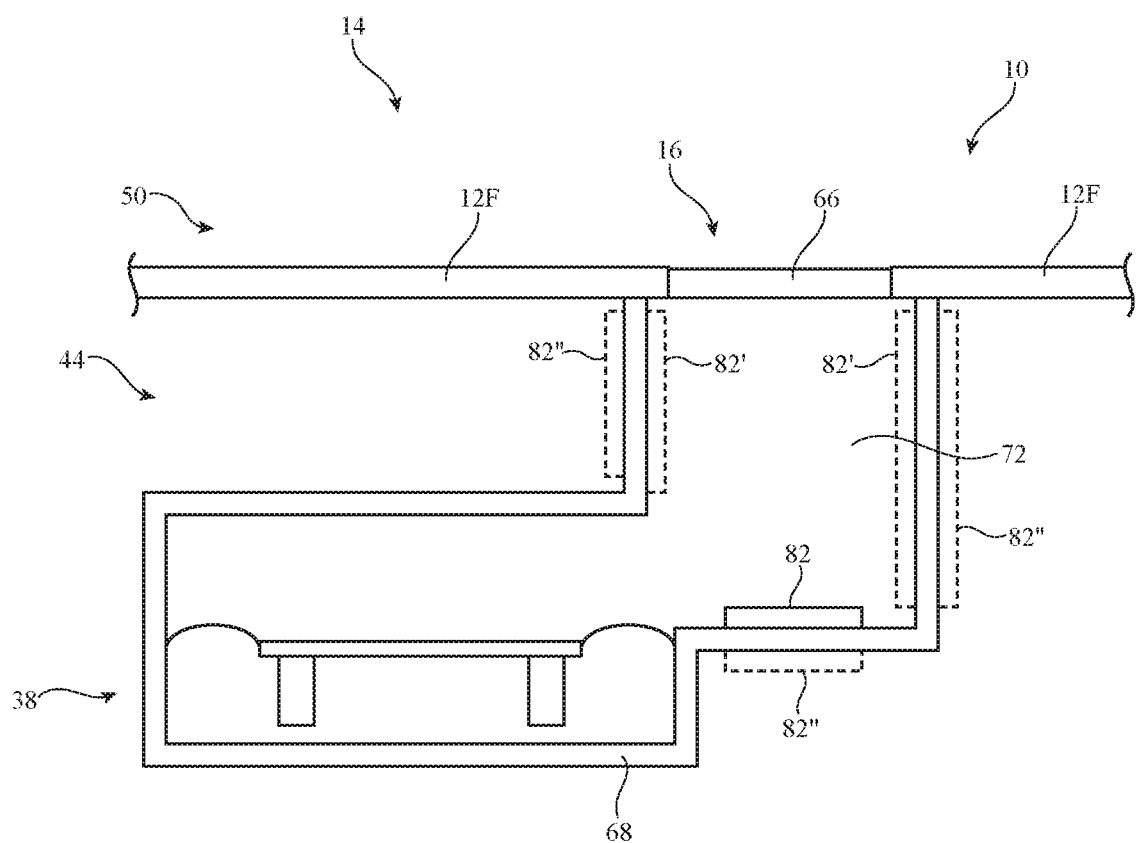
FIG. 13 is a cross-sectional side view of an illustrative electronic device having a shared optical and audio port in accordance with an embodiment.

In the example of FIG. 13, optical component 82 has been mounted on a horizontal interior surface of structure 68 in passageway 72 in alignment with port 16. In general, optical component 82 may mounted in an opening in structure 68, on an interior surface of structure 68 (e.g. in passageway 72), and/or on the exterior of structure 68. As shown by illustrative mounting locations 82', optical component 82 may be mounted on one or more sidewall surfaces in passageway 72 of structure 68. Arrangements in which one or more optical components such as optical component 82 are mounted on the exterior of structure 68 may also be used (see, e.g., illustrative mounting locations 82"). When optical component 82 is mounted in locations 82", overlapping portions of structure 68 may be formed from transparent material (e.g., transparent polymer, etc.), so that light for component 82 may pass through that portion of structure 68.

Figure 14:
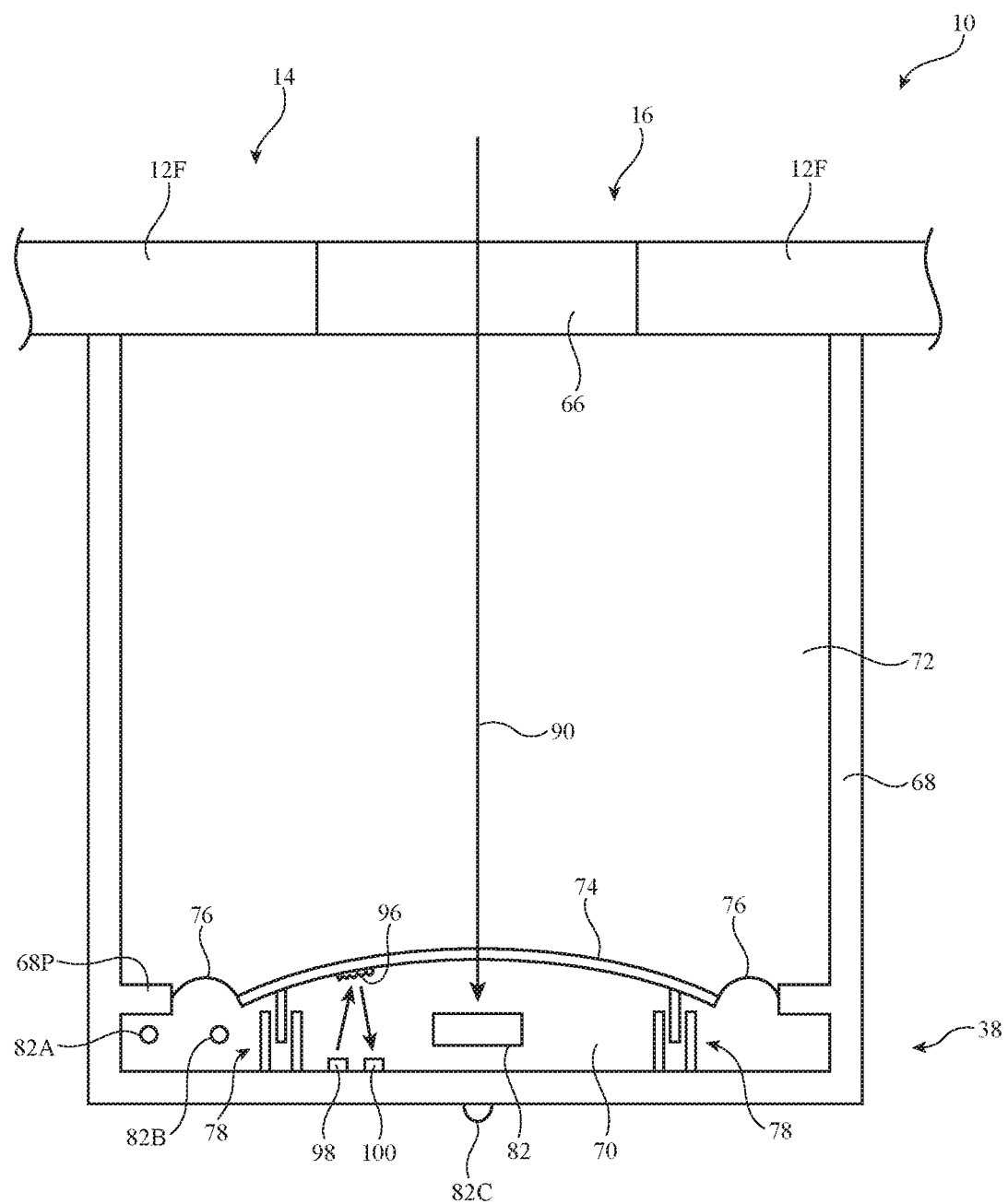
FIG. 14 is a cross-sectional side view of an illustrative electronic device showing illustrative locations for mounting an optical component in the vicinity of an audio component such as a speaker in accordance with an embodiment.

If desired, optical component 82 may transmit and/or receive light through a portion of speaker 38. Consider, as an example, the arrangement of FIG. 14. As shown in FIG. 14, structure 68 may be configured to align speaker diaphragm 74 with passageway 72 and port cover 66. Optical component 82 may be mounted under diaphragm 74. Diaphragm 74 may be formed from a transparent material (e.g., clear polymer, etc.) so that light may pass through diaphragm 74. Optical component 82 may be, for example, an ambient light sensor that receives ambient light 90 through diaphragm 74. If desired, optical component 82 may be placed at other locations such as locations 82A, 82B, and 82C. Locations 82A and 82B (as with the illustrative location of component 82 of FIG. 14) are located inside speaker back volume 70 of speaker 38 (e.g., inside the speaker box formed from structure 68 and on the side of the speaker diaphragm that faces away from port 16). In location 82B, optical component 82 may be overlapped by speaker surround 76. Surround 76 may be formed from a transparent material such as transparent polymer to allow light 90 to pass through surround 76. In location 82A, portion 68P of structure 68 overlaps optical component 82. Portion 68P may be formed from a transparent material such as transparent polymer to allow light 90 to pass through portion 68P to the optical component. In location 82C, optical component 82 is overlapped by transparent portions of structure 68 so that light may pass to/from component 82 through structure 68 and diaphragm 72. If desired, a reflective structure such as reflective coating structure 96 (e.g., a layer of metal, a dielectric mirror, a reflective coating of white polymer, etc.) may be formed on the lower surface of diaphragm 74. Light emitter 98 may emit light that is reflected by coating structure 96 and is detected by light detector 100. Control circuitry 30 can monitor the output of light detector 100 to measure the movement of diaphragm 74 (e.g., to form a microphone that detects audio, to monitor for diaphragm movements that might influence ambient light measurements made with optical component 82 under diaphragm 74, etc.).

Figure 15:
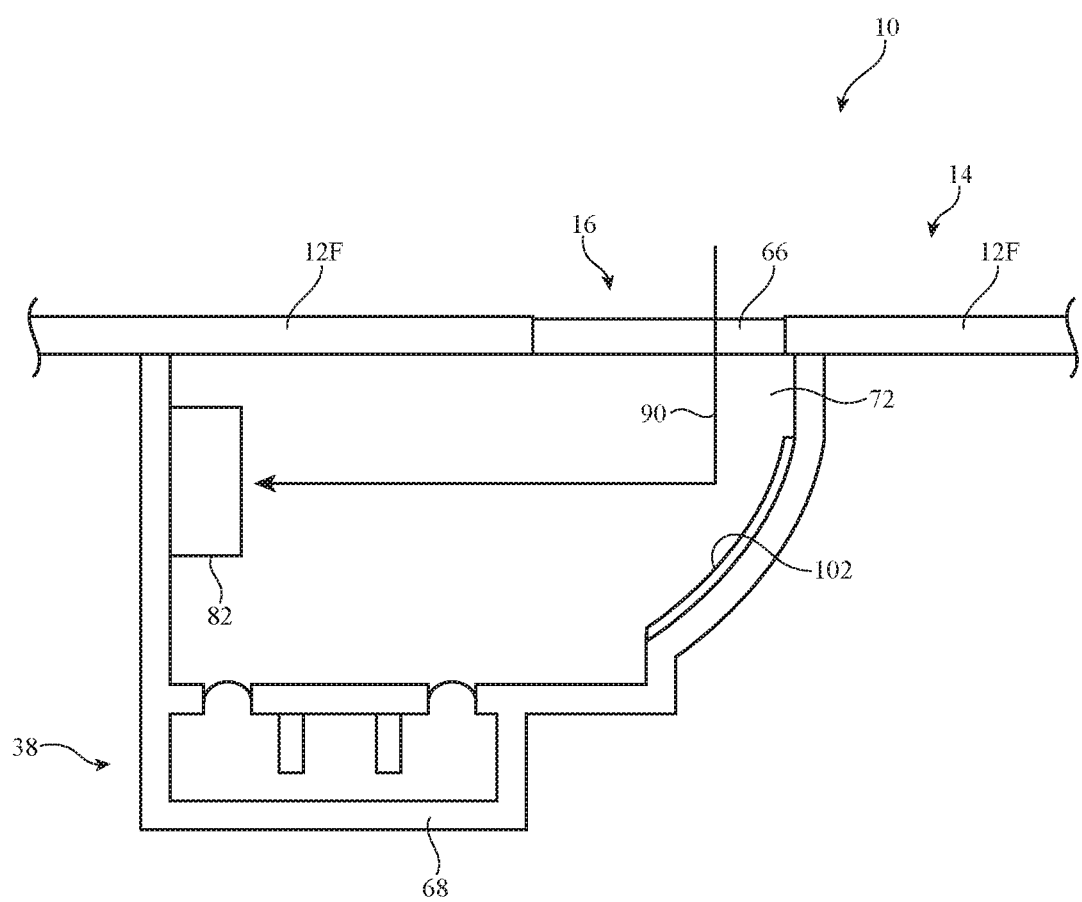
FIG. 15 is a cross-sectional side view of a portion of an illustrative electronic device having a reflective structure in a shared audio and optical port in accordance with an embodiment.

In the illustrative configuration of FIG. 15, structure 68 has been configured to support optical structure 102. Optical structure 102 of FIG. 15 may be, for example, a reflective coating on structure 68 that forms a mirror (e.g., a planar mirror), a lens formed from a mirror, a diffuser, optical structures that incorporate multiple components such as these, and/or other optical element. Optical structure 102 may, as an example, collect and reflect incoming ambient light 90 toward optical component 82. Optical component 82 may be mounted within structure 68, on an exterior surface of structure 68, in an opening formed in a sidewall of structure 68, or at other suitable location in device 10. Speaker 38 is acoustically coupled to port 16 via passageway 72 and can therefore emit sound through port 16 while light 90 is being received through port 16 by optical component 82 or while light emitted from optical component 82 is exiting device 10 through port 16.

Figure 16:
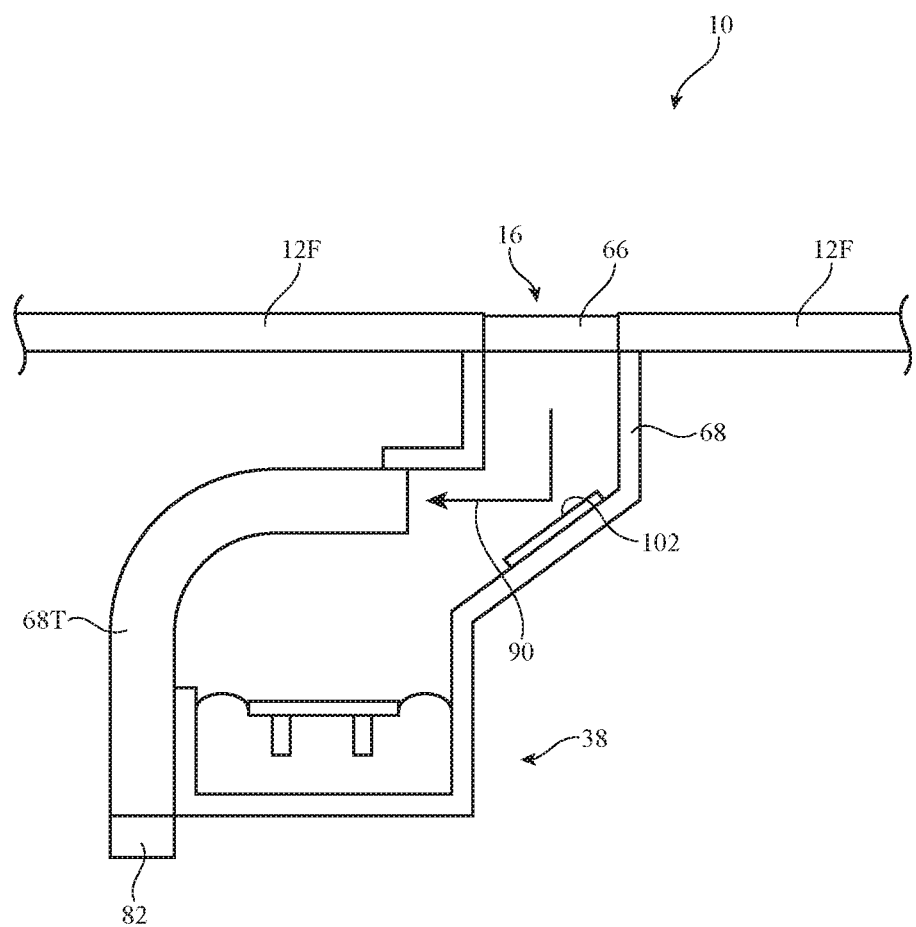
FIG. 16 is a cross-sectional side view of an illustrative electronic device with a shared audio and optical port and an optical element such as a mirror that couples light into a light guide in accordance with an embodiment.

In the example of FIG. 16, portion 68T of structure 68 is formed from transparent material that forms a light guide (e.g., an optical fiber, a bundle of optical fibers, a light-transparent waveguide formed from transparent material of a first index of refraction surrounded by transparent material of a second index of refraction that is lower than the first index of refraction, or other light guide structures). The light guide may have a straight elongated shape or an elongated shape with a curve as shown in FIG. 16. The light guide may have opposing first and second ends. The first end may be aligned with optical structure 102 and the second end may be aligned with optical component 82. During operation, incoming light 90 is reflected from structure 102 and is thereby coupled into the interior of portion 68T. Once within portion 68T, light 90 may be guided to optical component 82 (e.g., an ambient light sensor) in accordance with the principle of total internal reflection. Portion 68T may form part of a speaker box for speaker 38 and/or may otherwise be attached to other portions of structure 68. Configurations in which light guide structures for component 82 are separate from the speaker box structures for speaker 38 may also be used. Optical component 82 of FIG. 16 and the other FIGS. may be a light-receiving component such as an ambient light sensor, a light-emitting component, and/or a component that emits and receives light.

Figure 17:
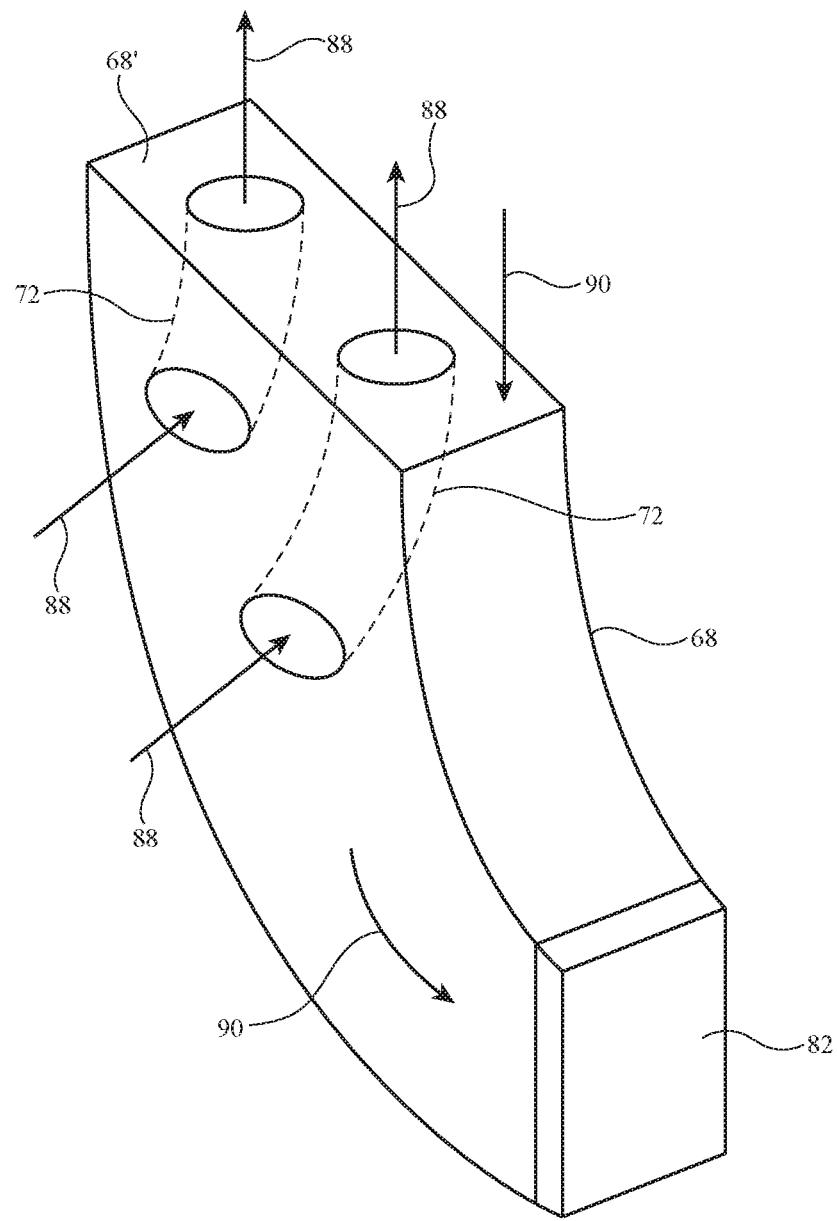
FIG. 17 is a perspective view of an illustrative structure that may be used in routing sound to an audio component and light to an optical component in accordance with an embodiment.

If desired, structure 68 may be configured to form one or more audio passageways within a light guide structure. As shown in FIG. 17, for example, structure 68 may be formed from a transparent material such as clear polymer or glass that guides light 90 to optical component 82. Surface of structure 68' may be aligned with port 16. Structure 68 may have air-filled passageways 72 that receive sound 88 from speaker 38 and that route sound 88 out of device 10 through port 16. Configurations in which optical component 82 emits light and/or the audio component in device 10 receives sound 88 through passageways 72 in a light-guide structure with air-filled passageways such as structure 68 of FIG. 17 may also be used.

Figure 18:
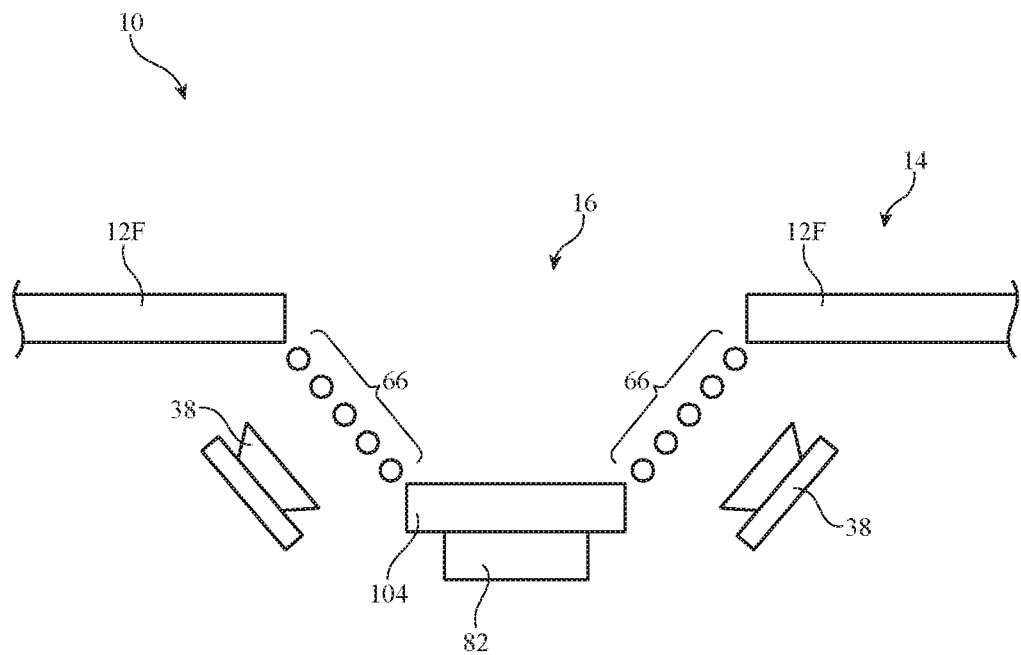
FIGS. 18, 19, 20, and 21 are cross-sectional side views of portions of illustrative electronic devices with audio and optical components sharing ports in accordance with embodiments.

In the illustrative configuration of FIG. 18, port cover 66 has a ring shape surrounding transparent member 104 and is located below the outer surface of housing portion 12F. Transparent member 104 may also be positioned within port 16 so that the outermost surface of transparent member 104 lies beneath the outermost surface of housing portion 12F. With this arrangement, port cover 66 covers part of the exposed portion of port 16 and transparent member 104 covers part of the exposed portion of port 16. Transparent member 104 may be formed from transparent polymer, glass, or other transparent material and may overlap optical component 82. During operation, optical component 82 may receive or emit light through transparent member 104 rather than through port cover 66. Port cover 66 may be used to allow sound to be emitted by or received by an audio component in interior 44. For example, one or more speakers 38 may emit sound that passes through port cover 66. The arrangement of FIG. 18 may help enlarge the surface area of port cover 66 (e.g., to allow sound to pass) while minimizing the size of the opening in housing portion 12F that is used to form port 16. If desired, transparent member 104 may have a layer of ink or other material that adjusts the outward appearance of member 104, may be configured to form a light guide, may form an optical filter, and/or may form other optical structures.

Figure 19:
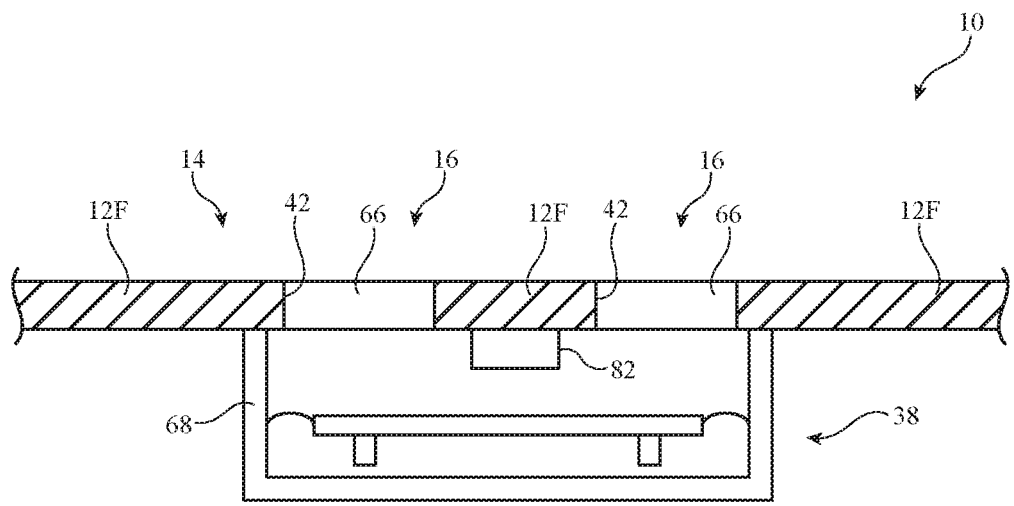

FIG. 19 shows how housing portion 12F may have a ring-shaped opening. Ring-shaped opening 42 in housing portion 12F forms a ring shape for port 16. Ring-shaped port cover 66 may be formed in opening 42 covering ring-shaped port 16. Optical component 82 may transmit and/or receive light through an overlapping region of housing portion 12F. Speaker 38 may emit sound through port covering 66 and port 16.

Figure 20:
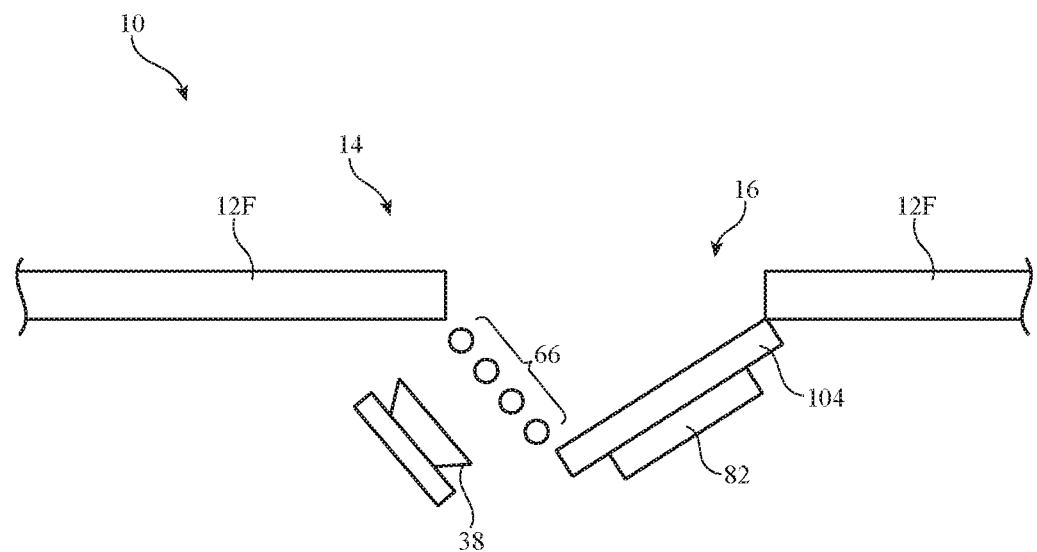

If desired, port cover 66 may be recessed within a cavity that is formed below the outermost portion of the opening in housing portion 12F that forms port 16. For example, port cover 66 may be recessed below the surface of housing portion 12F and may be oriented at an angle relative to the surface of housing portion 12F, as shown in FIG. 20. Speaker 38 may emit sound through port cover 66. Optical component 82 may emit or receive light through transparent member 104. In this type of arrangement, transparent member 104 and port cover 66 are recessed within port 16 rather than covering the outermost opening in housing portion 12F that forms port 16, thereby increasing the surface areas associated with port cover 66 and/or member 104 without overly enlarging the size of the opening in housing portion 12F used to form port 16.

Figure 21:
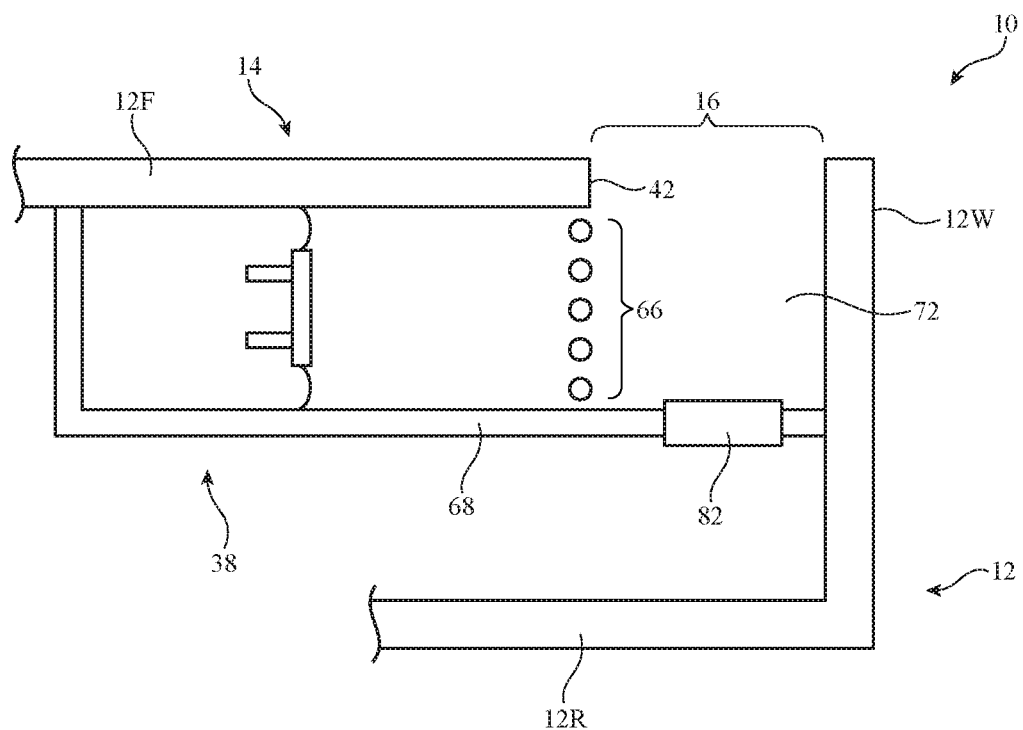

Another illustrative configuration for port 16 is shown in FIG. 21. As shown in FIG. 21, port cover 66 may be recessed within port 16 on a side of a cavity within device 10. Optical component 82 may be mounted at the bottom of passageway 72. Portions of passageway 72 may, if desired, be formed from housing sidewall member 12W. This type of arrangement may help minimize the size of port 16, because the size of port covering 66 may, if desired, be larger than the size of opening 42 in housing 12.

In addition to efficiently accommodating both audio and optical components, arrangements of the type shown in FIGS. 18, 19, 20, and 21 may help accommodate optical components that emit and/or receive light without causing the emitted and/or received light to be affected by passing through a mesh, perforated layer, or other acoustically transparent port cover structures. For example, optical component 82 of FIG. 18 may emit and/or receive light through transparent member 104 and this light need not pass through port cover 66. This allows port cover 66 to be formed using a configuration that potentially has a low light transmission (e.g., a configuration in which port cover 66 is opaque). In the example of FIG. 19, light emitted by or received by optical component 82 may pass through an overlapping portion of housing portion 12F without passing through port cover 66. The configuration of FIG. 20 allows light emitted by optical component 82 and/or light received by optical component 82 to pass through transparent member 104 without passing through port cover 66. In the configuration of FIG. 21, light emitted by or received by optical component 82 may pass through passageway 72 and port 16 without passing through port cover 66.

Arrangements such as these in which light for optical component 82 does not pass through port cover 66 may be helpful when it is desired to transmit and/or receive light without influence of the structures in port cover 66 such as when optical components include image sensors for capturing images, light-emitting components such as laser arrays for emitting arrays of dots (e.g., arrays of laser beams or other light beams associated with a dot projector in a structured-light three-dimensional image sensor), light-emitting and detecting devices for emitting and detecting light for a proximity sensor, and/or other optical components. Components such as these may also operate through port cover 66, if desired (e.g., by aligning outgoing light beams with perforations in the port cover structures, etc.).

As described above, one aspect of the present technology is the gathering and use of information such as sensor information (e.g., optical sensor information). The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device having an interior and an exterior, comprising:
   an array of pixels configured to display an image;
   a housing having a display cover layer portion that overlaps the array of pixels, wherein the housing separates the interior from the exterior, wherein the display cover layer portion has an opening forming an optical and audio port, wherein the display cover layer has first and second opposing sides, and wherein the first side faces the array of pixels;
   a port cover in the opening, wherein the port cover covers the optical and audio port;
   a structure in the interior that forms a passageway aligned with the opening, wherein the structure is coupled to the first side of the display cover layer;
   an audio component coupled to the optical and audio port through the passageway and configured to emit sound through the passageway and the port cover; and
   an optical component coupled to the optical and audio port, wherein light associated with the optical component passes through the passageway.

2. The electronic device defined in claim 1 wherein the audio component is a speaker having a transparent diaphragm through which the light passes to the ambient light sensor.

3. The electronic device defined in claim 1 wherein the port cover has a mesh with mesh openings, wherein the sound passes through the mesh openings, and wherein the light passes through the mesh openings.

4. The electronic device defined in claim 1 wherein the audio component comprises a speaker with a diaphragm and wherein the electronic device further comprises a light-emitting device that emits light towards the transparent diaphragm and a light-detecting device that detects light that has reflected from the transparent diaphragm.

5. An electronic device having an interior and an exterior, comprising:
   pixels configured to display an image;
   a housing having a transparent portion that overlaps the array of pixels, wherein the housing encloses the interior and is surrounded by the exterior;
   an optical and audio port formed in an opening in the transparent portion;
   a port cover in the opening, wherein the port cover covers the optical and audio port;
   a speaker configured to emit sound through the port cover;
   a structure in the interior, wherein the structure is coupled to the transparent portion and forms a passageway aligned with the opening, and wherein the structure conveys sound between the speaker and the port cover through the passageway; and
   an ambient light sensor configured to receive light through the port cover and the passageway.

6. The electronic device defined in claim 5 wherein the speaker and the ambient light sensor are formed in the interior.

7. The electronic device defined in claim 6 further comprising a light-diffusing structure in the passageway.

8. The electronic device defined in claim 7 wherein the light-diffusing structure comprises a textured reflective coating.

9. The electronic device defined in claim 6 wherein the speaker has a speaker box formed from the structure.

10. The electronic device defined in claim 6 wherein the structure forms a sidewall of the passageway and wherein the ambient light sensor is mounted on the sidewall.

11. The electronic device defined in claim 6 further comprising an optical structure supported by the structure that is configured to reflect light received through the port cover to the ambient light sensor.

12. The electronic device defined in claim 5 further comprising a light guide configured to receive light that has passed through the port cover and configured to provide the received light to the ambient light sensor.

13. The electronic device defined in claim 12 wherein the light guide has an audio passageway through which sound emitted by the speaker passes.

14. An electronic device having an interior and an exterior, comprising:
- a housing that separates the interior from the exterior;
- a display having an array of pixels that form an active area, having an inactive area without pixels, and having a display cover layer that overlaps the active and inactive areas, wherein the display cover layer has a display cover layer opening in the inactive area;
- an optical and audio port formed in an opening in the display cover layer;
- a port cover in the opening, wherein the port cover covers the optical and audio port;
- a structure in the interior that forms a passageway aligned with the opening, wherein the structure is coupled to the display cover layer;
- a speaker configured to emit sound through the passageway in the interior to the port cover and through the display cover layer opening; and
- an ambient light sensor configured to detect light that passes through the passageway and the display cover layer opening.

15. The electronic device defined in claim 14 wherein the ambient light sensor comprises a color ambient light sensor.

\* \* \* \* \*